United States Patent [19]

Cadillac et al.

[11] 4,206,896
[45] Jun. 10, 1980

[54] MOUNT FOR A POWER RESCUE TOOL

[76] Inventors: Joseph A. Cadillac; John G. Cadillac, both of 314 Lake St., Upper Saddle River, N.J. 07458

[21] Appl. No.: 964,159

[22] Filed: Nov. 28, 1978

[51] Int. Cl.² .......................................... F16M 11/00
[52] U.S. Cl. .................................... 248/310; 248/176
[58] Field of Search ............ 248/309, 310, 314, 311.1, 248/139, 140, 75, 80, 291, 176; 211/13

[56] References Cited

U.S. PATENT DOCUMENTS

| 715,287 | 12/1902 | Paine | 248/139 |
| 1,580,627 | 4/1926 | Peterson | 248/139 X |
| 2,406,334 | 8/1956 | Keller et al. | 248/311.1 |
| 2,763,454 | 9/1956 | Lindsell | 248/140 X |
| 3,199,000 | 8/1965 | Nippert | 248/309 |
| 3,236,483 | 2/1966 | House | 248/140 |
| 3,638,889 | 2/1972 | Samuelson | 248/291 X |
| 3,942,669 | 3/1976 | Savage | 248/310 R |
| 3,970,274 | 7/1976 | Resk | 248/185 |
| 4,019,708 | 4/1977 | Croup | 248/140 X |
| 4,093,171 | 6/1978 | Mengo | 248/314 X |

Primary Examiner—J. Franklin Foss
Attorney, Agent, or Firm—Shoemaker and Mattare, Ltd.

[57] ABSTRACT

A mount (storage bracket) for a power rescue tool which permits convenient storage of such a power rescue tool while also permitting movement of the mount (storage bracket) into a presentation which is advantageous for removal of the power rescue tool from storage.

5 Claims, 5 Drawing Figures

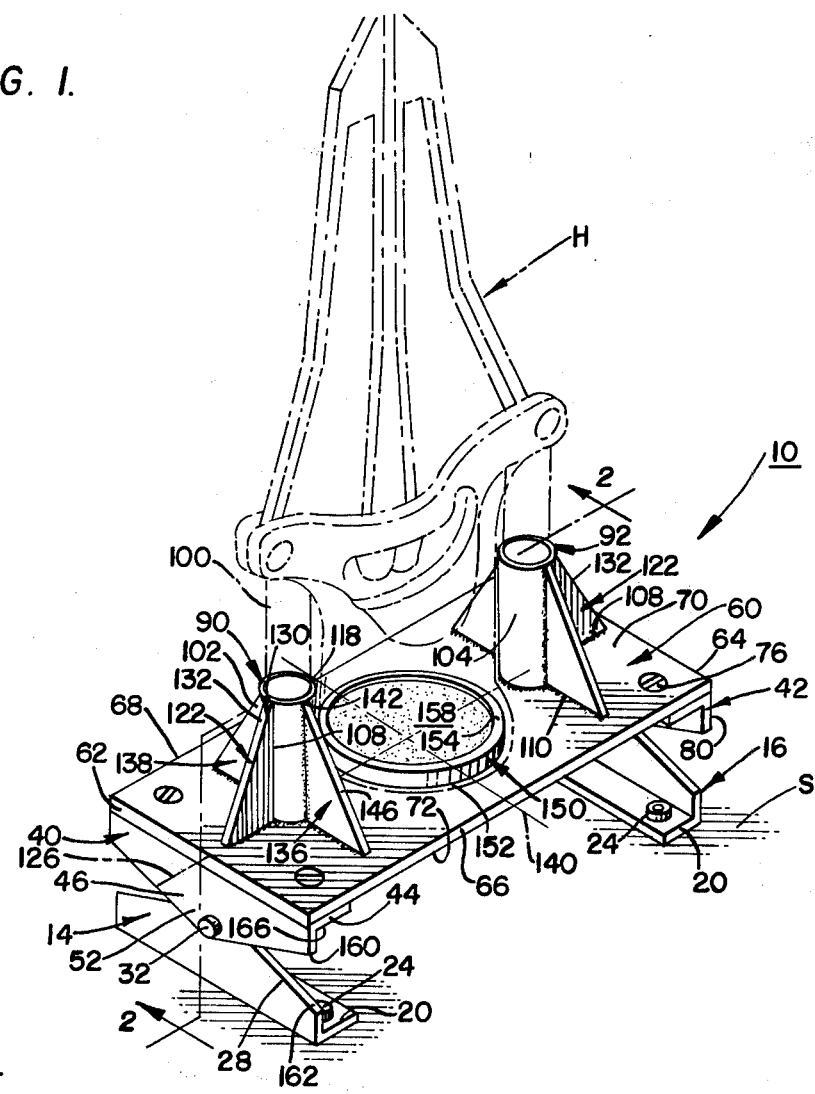
FIG. 1.
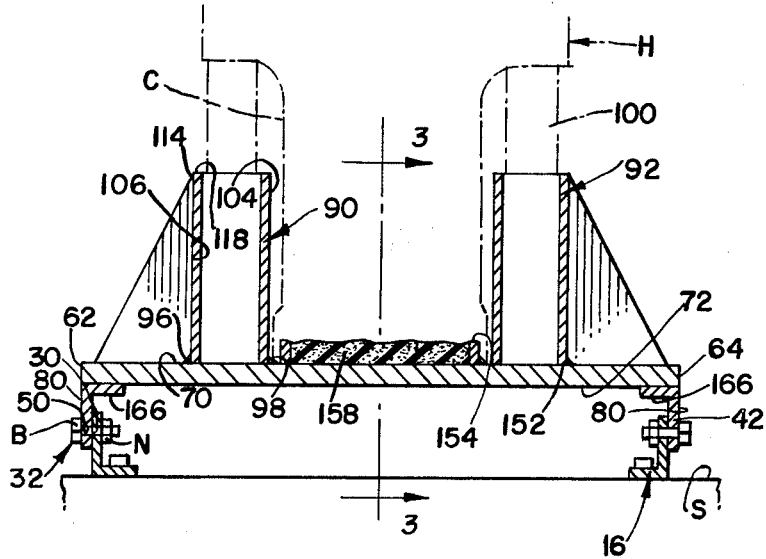
FIG. 2.
FIG. 3.

4,206,896

MOUNT FOR A POWER RESCUE TOOL

BACKGROUND OF THE INVENTION

The present invention relates in general to supports, and, more particularly, to movable supports.

Many, if not all, emergency vehicles, such as fire engines, and the like, carry Hurst TM power rescue tools to remove doors, or other such elements from cars or other vehicles which have been disabled in a manner which prevents opening of the door in a normal manner. The Hurst TM power rescue tool is a well-known tool used by firemen and other rescuers and has proven to be an invaluable tool in many rescue operations. It is noted that hereinafter, in the interest of brevity, the term "Hurst" will be used without any trademark notation. However, it is to be understood that the term is used in a trademark sense even though such designation is omitted.

It is common to store the Hurst power rescue tool in a compartment on the rescue vehicle. Usually, on most vehicles, since a bracket is not available, the Hurst power rescue tool is stored laying down. The tool is, therefore, subject to damage unless it is fastened down, which usually encumbers its accessibility. As the power rescue tool is large and cumbersome to remove from such compartment, valuable seconds may be lost while the rescuers struggle to remove the power rescue tool from the storage area therefor. It is well known that even a second can be valuable in a rescue operation; thus, there is need for a device which permits a Hurst power rescue tool to be conveniently stored during non-use periods, yet which permits that power rescue tool to be quickly and easily removed for use. The inventors are not aware of any such device.

Even though rapid removal of equipment is a very important consideration, a competing consideration involves the fact that a wide variety of equipment must be carried on emergency vehicles. As storage space on these vehicles is limited, equipment must be selected carefully. Other equipment usually suffers due to this practice, and tangled equipment is a danger to both the rescuers and the people in peril. Thus, there is a need for a device which stores a Hurst power rescue tool in a manner which makes effective use of storage space so that the Hurst power rescue tool does not interfere with other equipment stored nearby, and vice versa.

SUMMARY OF THE INVENTION

The device embodying the teachings of the present invention permits convenient storage of a power rescue tool such as a Hurst power rescue tool, during non-use periods, yet makes removal of that power rescue tool expeditious.

The device includes a platform having a pair of leg receiving tubes mounted thereon to extend vertically upward from the platform, and a cylindrical boss mounted on the platform between the tubes. The tubes slidingly accommodate the legs of a Hurst power rescue tool, and the boss slidingly accommodates the piston cylinder of such a Hurst power rescue tool. A cushion is located within the boss and the bottom of the piston cylinder rests on that cushion.

The platform can be mounted on a sliding drawer which is located in a tool cabinet of a rescue vehicle, or the platform can be located on the outside of the vehicle in a stationary manner. The platform can also be mounted on brackets which pivot to tilt the platform, and thus tilt the power rescue tool, to expedite access and removal of that power rescue tool from the mount. Supports such as gusset plates can also be included to further support the tubular sleeves.

The mount embodying the teachings of the present invention therefore permits storage of a Hurst power rescue tool in a position and location which makes the most effective use of available storage space yet which will permit presentation of such a power rescue tool for rapid removal thereof. As seconds can prove to be vital, such presentation of the Hurst power rescue tool can be extremely important. The power rescue tool can be stored along with other equipment and still be readily accessible for rapid removal. Storing the power rescue tool outside of the vehicle frees space in equipment storage areas on the vehicle for storage of still more tools, or simply makes access to those stored tools easier, or the like.

OBJECTS OF THE INVENTION

It is, therefore, a main object of the present invention to mount a Hurst power rescue tool in a conveniently storable manner.

It is another object of the present invention to mount a Hurst power rescue tool in a manner which provides for the most expeditious removal thereof.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIG. 1 is a perspective of a mount for a Hurst power rescue tool embodying the teachings of the present invention.

FIG. 2 is an elevation view taken along line 2—2 of FIG. 1.

FIG. 3 is an elevation view taken along line 3—3 of FIG. 2.

DETAILED DESCRIPTION OF THE INVENTION

Figure 4:
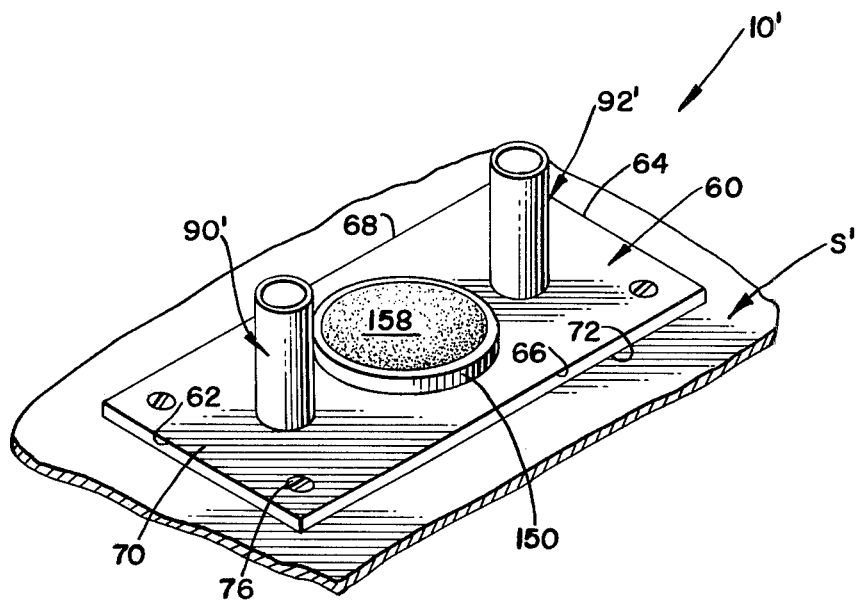
FIG. 4 is a perspective of another form of a mount for a Hurst power rescue tool embodying the teachings of the present invention.

Shown in FIG. 1 is a mount 10 for mounting a Hurst power rescue tool H in a manner which permits that power rescue tool to be conveniently stored and removed for use in an expeditious manner. The mount 10 is one form of the device embodying the teachings of the present disclosure and includes a pair of spaced L-shaped lower mounting brackets 14 and 16 each having a base flange 20 through which spaced attaching fastener receiving holes are defined for receiving fasteners, such as bolts 24, or the like, and an upright triangular flange 28 integral with the base flange 20. A pivot pin receiving hole 30 is defined in the apex of the triangle and the base of the triangle is attached to the base flange. A pivot pin 32 is received in the holes 30.

Each one of a pair of spaced upper connecting brackets 40 and 42 is L-shaped and includes a base element 44 and a triangular flange 46 having the base thereof connected to the base element 44. A pivot pin receiving hole 50 is defined through apex 52 of the triangular flange, and a plurality of fastener receiving holes are defined in the base element, preferably near the corners thereof. The pivot pin 32 is received through hole 50 which is aligned with hole 30 to pivotally attach each of the upper brackets to a corresponding one of the lower brackets at the apexes of the triangular flanges thereof. The brackets are thus each pivotal about the pin 32; however, in the preferred embodiment, the lower bracket is fixed to a suitable mounting surface S, such as a shelf within a fire engine equipment compartment, or a shelf on the outside of the vehicle, or the like, and thus, the upper bracket is pivotable with respect to the lower bracket for a purpose to be discussed hereinafter.

A planar platform 60 is rectangular in peripheral shape having end edges 62 and 64 and side edges 66 and 68, an upper surface 70 and a lower surface 72. The upper mounting brackets are securely attached to the platform by fasteners, such as mounting screw 76, or the like, so that the apex 52 of each of the upper mounting brackets is located beneath a corresponding end edge of the platform. As best shown in FIGS. 1 and 2, outer surface 80 of each of the upper bracket triangular flanges is essentially flush with the platform end edges.

As shown in FIG. 1, a pair of spaced tubular leg receiving sleeves 90 and 92 are mounted at one end 96 thereof on the platform upper surface 70 to extend essentially vertically upward therefrom. The sleeves are attached to the platform, as by welds 98, or the like, and are sized and spaced to slidingly accommodate legs 100 of the Hurst power rescue tool H. Each of the sleeves has a plurality of triangular gusset plates 102 attached to outer surface 104 thereof at one leg 106 of the gusset plate and to upper surface 70 at the other leg 108 of the gusset plate, as by weld 110, or the like. The leg 106 has a length essentially equal to the height of the sleeve so that apex 114 of the gusset plate is substantially flush with upper rim 118 of the sleeve. The gusset plates can be attached to the sleeve in any suitable manner, such as welding, or the like, and support the sleeves on the platform. As shown in FIG. 1, the gusset plates are preferably in the form of right triangles and a preferred arrangement of the gusset plates includes a longitudinal plate 122 having leg 108 oriented to be colinear with longitudinal centerline 126 of the platform and having apex 130 thereof located adjacent end edge 62 or 64 of the platform 60 so the hypotenuse 132 of each longitudinal gusset plate extends inwardly of the platform end edges along the longitudinal centerline of that platform. The preferred gusset plate arrangement further includes a pair of transverse gusset plates 136 and 138 which are coplanar with each other and each of which has leg 108 thereof oriented to be essentially parallel with platform transverse centerline 140 so that apex 142 of each of the transverse gusset plates is located adjacent a side edge 66 or 68 of the platform, and the hypotenuse 146 of each transverse gusset plate extends inwardly of the platform transversely thereof. Preferably, the gusset plates are oriented to be on diameters of the tubular sleeves, but other arrangements also can be used without departing from the scope of the present disclosure, just so the gusset plates do not interfere with movement of the Hurst power rescue tool.

Also mounted on platform upper surface 70 is a circular boss 150. The boss 150 is located between the sleeves 90 and 92 so that those sleeves are positioned diametrically of the boss. The boss is integrally attached to the platform upper surface 70 as by weld 152, or the like and has an upper rim 154 located above the surface 70. A pad 158, of foam material, or the like, is accommodated within the boss and is preferably attached to the platform upper surface 70. The piston cylinder C of the Hurst power rescue tool is received and accommodated within the boss 150 to securely support that power rescue tool on the mount 10.

As shown in FIGS. 1 and 2, the legs 100 of the power rescue tool are slidingly accommodated in the sleeves and the piston cylinder C is accommodated in the boss 150 so the clamp H is supported in an upright orientation with respect to the platform, and is attached to the support surface S via the mount to be pivotable with respect thereto.

Operation of the pivotal mount 10 is evident from the figures. The Hurst power rescue tool is stored in an upright orientation, and to remove same for use, the platform is tipped along the longitudinal centerline thereof to present the power rescue tool to the user in a convenient orientation. The tipping movement of the platform is indicated in FIG. 3 by the arrow T. The height of the upper and lower bracket triangular flanges can be selected so that outer apexes 160 and 162 thereof contact the surface S or lower surface 166 of the upper flanges 40 and 42, respectively, to prevent further pivoting movememt of the platform when the power rescue tool is in the desired orientation. The pivot pin 32 can also be set to adjust the speed of rotation of the platform about the centerline 126 thereof by suitably adjusting the tightness of fit between the flanges and the pin, and between the flanges via the pin. Thus, as shown in FIG. 2, the pin can include a bolt B having a nut N threaded thereon to adjust the tightness with which the flanges are coupled together, and thereby to control the pivotal movement thereof. Furthermore, using the bolt B, a permanent platform tilt can be set.

Figure 5:
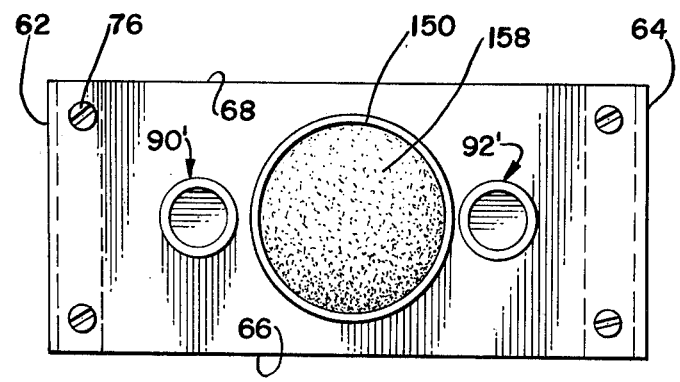
FIG. 5 is a plan view of the mount shown in FIG. 4.

An alternative embodiment of the mount is shown in FIGS. 4 and 5 and the tubular sleeves 90' and 92' thereof are unsupported along the outer surfaces thereof. The mount shown in FIGS. 4 and 5 is indicated by the numeral 10' and can be pivoted in a manner similar to the mount 10, or the platform of the mount 10' can be fixed directly to a surface S'. The mount 10' is shown fixed directly to surface S' in FIGS. 4 and 5 for the sake of convenience, but it is to be understood that mount 10' can include upper and lower brackets pivotably interconnected as shown in FIGS. 1–3.

The surface S' may be fixed as a shelf in a tool cabinet, or in a vehicle, or a shelf on the outside of a vehicle, or the like, or the surface S' may be movable, as a sliding drawer, or other sliding element, or the like, or the surface S' can even represent a rotatable "Lazy Susan" type element. The mount 10' maintains the power rescue tool in an upright orientation during such movement.

The mounts of the present disclosure can be located on a fire engine, or other such emergency or rescue equipment, within a cabinet or other storage area on such equipment. Alternatively, the mount of the present disclosure can be located on the outside of the rescue equipment as the mount can hold the power rescue tool securely enough so that loss of or damage to the power rescue tool is minimized. Suitable locks can also be used to further attach the power rescue tool to the mount when that power rescue tool is to be stored on the outside of the emergency equipment.

As this invention may be embodied in several forms without departing from the spirit or essential charcteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

What is claimed is:

1. A mount for a power rescue tool comprising:
   a plurality of mounting brackets each fixed on a mounting surface;
   a plurality of connecting brackets each pivotally connected to one of said mounting brackets;
   an elongate platform fixedly connected on top of said connecting brackets for pivotal movement therewith;
   a pair of spaced leg holders mounted on said platform on opposite sides of a transverse centerline of said platform for slidingly accommodating legs of a power rescue tool;
   a boss mounted on said platform between said leg holders for acommodating a piston cylinder of a power rescue tool, said boss having a cushion therein; and
   a plurality of supports supporting each of said leg holders on said platform.

2. The mount defined in claim 1 wherein said plurality of supports are connected to said platform and to each of said leg holders.

3. The mount defined in claim 1 wherein each of said brackets has a triangular shaped leg, and said triangular shaped legs are connected together at apexes thereof.

4. The mount defined in claim 1 wherein said plurality of brackets include a pair of mounting brackets and a pair of connecting brackets.

5. The mount defined in claim 1 wherein said elongate platform is pivotable about a longitudinal centerline thereof.

* * * * *